July 26, 1955 W. W. HENDRIXSON 2,713,751
GARDEN EDGING DEVICE
Filed Sept. 11, 1951
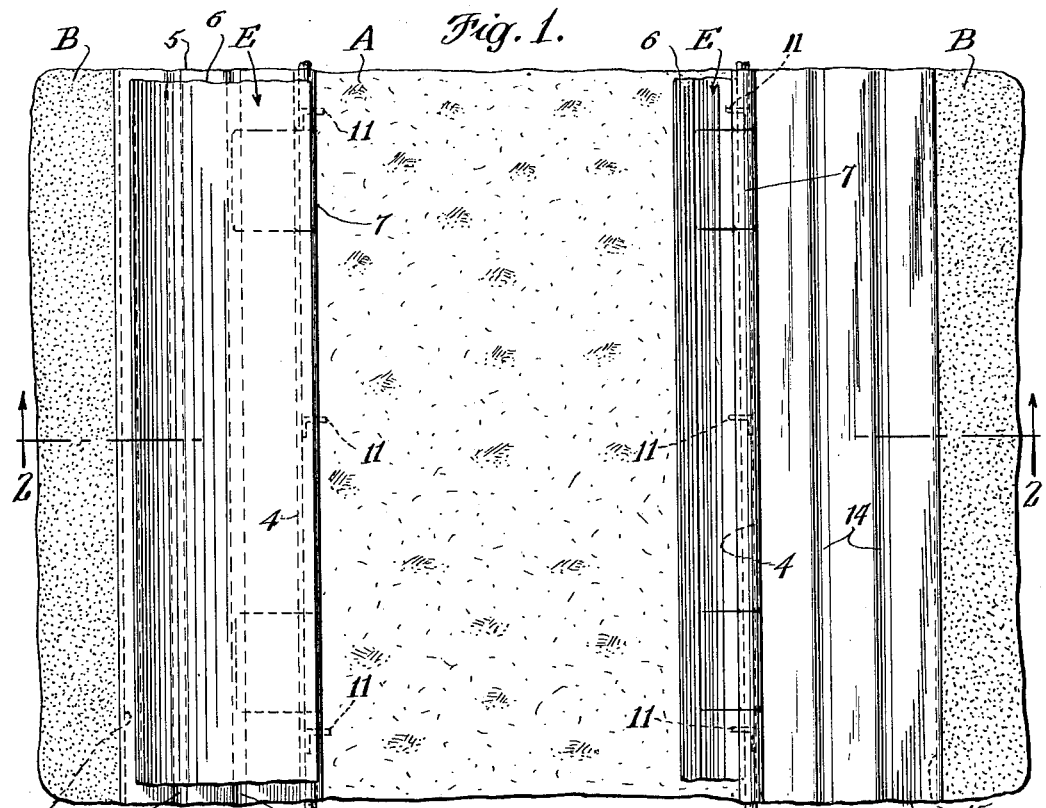
INVENTOR
Widener W. Hendrixson
BY
Gustav Genzlinger
ATTORNEY United States Patent Office 2,713,751
Patented July 26, 1955

2,713,751

GARDEN EDGING DEVICE

Widener W. Hendrixson, Ashland, Oreg.

Application September 11, 1951, Serial No. 246,081

1 Claim. (Cl. 47—33)

This invention relates to a device for forming edges for gardens and the like.

The primary object of my invention is the provision of a device adapted to form an edge for gardens which is neat in appearance, inexpensive to manufacture, and which can be easily installed.

Another object of my invention is the provision of an edging device for gardens which is particularly useful in keeping a lawn around the garden trim right up to the edge of the garden.

A further object of my invention is the provision of an edging device for gardens having means enabling surrounding grass to be cut neatly and trim around the edges of the garden by a lawn mower, without the necessity of hand trimming.

Another object of my invention is the provision of an edging device for gardens which is adapted to prevent roots of surrounding grass from spreading into the garden area.

A further object of my invention is the provision of an edging device for gardens enabling neat and trim cutting of grass immediately surrounding the garden by a lawn mower without injury to plants located adjacent to or overhanging the edges of the garden.

A more specific object of my invention is the provision, in an edging device of the character described, of a runway for the wheel of a lawn mower to enable neat and trim cutting of the grass immediately surrounding the garden.

Another object of my invention is the provision, in an edging device of the character described, of a hinged member adapted when swung to an upright position to protect plants of the garden from injury by a lawn mower.

How the foregoing, together with such other objects and advantages as may hereinafter appear, or are incident to my invention may be realized is illustrated in preferred form in the accompanying drawings, wherein—

Fig. 1 is a fragmentary plan view of a portion of a garden showing a device constructed in accordance with my invention positioned at the side edges of the garden;

Fig. 2 is a cross section taken on the line 2—2 of Fig. 1, showing a hinged member which I employ in its down or normal position at the left edge of the garden and its up or open position at the right edge of the garden; and Fig. 3 is a cross section illustrating a modification of the invention.

In the drawings I have illustrated a garden at A, lawn portions at B at the sides of the garden, trimmed or cut grass at C, plants and shrubbery at D, and edging devices constructed in accordance with my invention at E. In the particular illustration I have only shown edging devices at the sides of the garden, but it is to be understood that I contemplate employing them at the ends as well as at the sides.

The edging device E comprises an upright strip 4, a base strip 5 extending laterally from the strip 4 in a direction away from the garden C, and a swingable cover strip 6 having hinged connection 7 with the upright strip 4 adjacent its upper edge.

In the form of my invention illustrated in Fig. 2 the upright strip 4 is welded to the base strip at 8 to form an angle member and the upright strip 4 is provided with a lower extension 9 adapted to enter the ground.

The upright strip 4 constitutes a retaining wall for the garden and the base strip 5 constitutes a runway for a wheel of a lawn mower when the hinged cover strip 6 is swung to its upper or open position as shown at the right hand portion of Fig. 2. A lawn mower 10 is diagrammatically illustrated in dot and dash lines in Fig. 2.

In order to firmly position the device I provide downwardly extending members 11 adapted to enter well into the ground, these members being suitably spaced lengthwise of the device to give firm support and being secured in place as by means of welding.

The cover strip 6 is preferably of such lateral extent as to substantially cover the base strip 5 when it is in its normal or down position as shown at the left portion of Fig. 2. In cross section this cover strip may be of any desired ornamental shape to provide a neat appearing edge for the garden, and in the drawings I have shown it of a simple curved shape. If desired, ornamental designs may be embossed in the cover as indicated at 12 in Fig. 3, to not only add ornamentation but also to act as stiffeners for the cover which is preferably made of relatively thin metal as are also the strips 4 and 5. Stiffeners in the form of longitudinally extending ribs 13 and 14 are provided for the strips 4 and 5. Also the edge 15 of the strip 5 is bent down to reinforce the edge.

In the modification of Fig. 3 I have shown a one piece angle construction in which the upright flange 16 of the angle member constitutes the garden retaining wall and in which the base flange 17 constitutes the lawn mower runway. In order to gain strength the base flange 17 of the angle member may be folded back on itself as shown at 18.

Instead of employing a hinge of the type shown in Figs. 1 and 2, I may employ the simple hinge construction of Fig. 3 in the form of hooks 19 entering holes 20 in the upright flange 15. Pegs 21 secured to the angle member are provided for positioning the device.

It is to be observed that since the base strips 5 extend laterally outwardly from the upright retaining strips 4 the roots of the surrounding grass are prevented from spreading into the garden area to rob the plant roots of nourishment.

When the grass surrounding the garden needs cutting, the cover strips 6 are swung upwardly and the wheel of the lawn mower is run on the base strip 5 as a runway to enable cutting the grass neat and trim up to the garden edge. When the cover strip is in this upward position any plants creeping over the edge of the garden or plants closely adjacent the edge are held back by the cover strip out of the path of the lawn mower, thus preventing injury to the plants.

Through the practice of my invention hand trimming of the grass surrounding a garden is entirely eliminated, a garden of neat appearance is provided, and the spreading of grass roots into the garden is prevented.

I claim:

A garden edging device comprising a longitudinally extending retaining strip adapted to be set vertically to form a garden retaining wall, a base strip normal to and extending longitudinally for the length of said retaining strip, a hinged plant protecting strip extending longitudinally for the length of said retaining strip, and means for hinging said plant protecting strip to said retaining strip at its upper portion, said plant protecting strip when swung to a down position covering said base strip and presenting a rest for plants overhanging the edge of the garden, and when swung to an up position constituting means for holding such plants back clear of the edge of the garden.

References Cited in the file of this patent

UNITED STATES PATENTS

| | | |
|---|---|---|
| 352,146 | Oungst | Nov. 9, 1886 |
| 650,024 | Riggins | May 22, 1900 |
| 670,001 | Morss | Mar. 19, 1901 |
| 936,401 | Baldridge | Oct. 12, 1909 |
| 2,184,904 | Boehme | Dec. 26, 1939 |

FOREIGN PATENTS

| | | |
|---|---|---|
| 106,744 | Hungary | Aug. 1, 1933 |
| 399,251 | Great Britain | Oct. 5, 1933 |
| 551,353 | France | Jan. 6, 1923 |